Nov. 20, 1956 K. M. ZAHN 2,771,018
SPRING MOUNTED TOOL SHANK
Filed Aug. 17, 1953
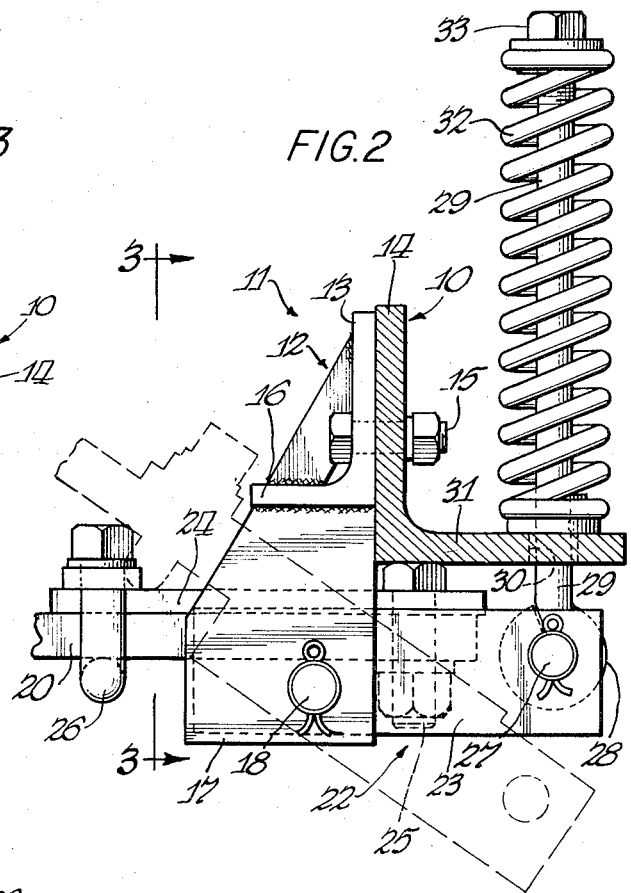
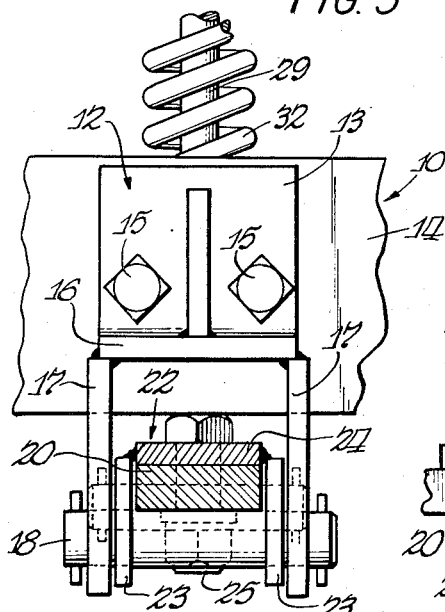
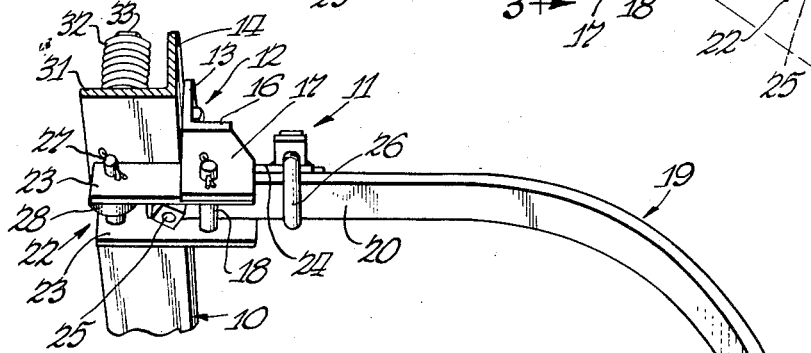
INVENTOR
KARL M. ZAHN
Paul O. Pippel
ATTORNEY

United States Patent Office 2,771,018
Patented Nov. 20, 1956

2,771,018
SPRING MOUNTED TOOL SHANK

Karl Martin Zahn, Stockton, Calif., assignor to International Harvester Company, a corporation of New Jersey Application August 17, 1953, Serial No. 374,611

2 Claims. (Cl. 97—47.84)

This invention relates to agricultural implements and particularly to tillage tools. More specifically the invention concerns an improved means for mounting an earth-penetrating tool upon a supporting frame. The invention will be described in its application to an implement of the type of a field cultivator, wherein a wheeled supporting frame is provided with a plurality of cultivator teeth mounted upon shanks affixed to the carrying frame. Some flexibility is desirable in the earth-penetrating tools of an implement of this type in order to secure a vibrating action of the cultivator teeth in the ground, resulting in improved tillage of the soil.

The object of the present invention is the provision of improved means for mounting earth-penetrating tools upon an implement frame.

Another object of the invention is the provision of an improved spring mounting mechanism for attaching a cultivator shank to a supporting frame, resulting in a vibratory action of the tools in the ground as the implement is propelled over a field to be tilled.

A further object of the invention is the provision of improved clamping means for securing a tool shank to a supporting frame of the square tool bar type.

Other objects and advantages of the invention will become clear from the following detailed description when read in conjunction with the accompanying drawings, wherein:

Figure 1 is a view in perspective, partly in section, showing the manner in which a tool-carrying shank is secured to the angle bar type of carrying frame by the clamping mechanism incorporating the features of this invention;

Figure 2 is a view in side elevation, partly in section, showing the clamping mechanism of this invention, and indicating the pivoting of the tool-carrying shank in dotted lines; and Figure 3 is a view taken on the line 3—3 of Figure 2.

Referring to the drawings, it will be observed that the numeral 10 designates a transversely extending angle bar which forms a part of a wheel supported tool-carrying frame adapted to be propelled over the ground by a tractor or the like, and extending transversely of the direction of travel. It may be understood that the tool assembly 11 mounted upon the frame 10 is one of a plurality of such assemblies mounted at laterally spaced locations thereon.

The tool assembly 11 comprises a clamping element 12 including an upright flange 13 adapted to abut the upright flange 14 of the tool bar 10 and secured thereto by bolts 15.

The clamping element 12 also has a horizontal flange 16 to which are affixed, as by welding, laterally spaced depending legs 17 apertured to receive a transversely extending pivot pin 18.

The tool assembly 11 also includes a rectangular shank 19, preferably resilient, and having a horizontal portion 20. The tool shank 19 extends rearwardly and curves downwardly and forwardly and has mounted upon its lower end an earth-penetrating tool 21.

Affixed to the forward end of the horizontal portion 20 of the shank 19 is a rockable member 22 comprising laterally spaced brackets 23 on opposite sides of the shank 19 and connected by a part 24 welded to the brackets and lying closely adjacent the forward end of the horizontal portion 20 of the tool shank. The brackets 23 project forwardly beyond the end of the tool shank and the end of the shank is secured thereto by a bolt 25. A rearward extension of the plate 24 is affixed to the shank by a U-bolt 26, so that the member 22 is rigid with the forward end of the tool shank.

The brackets 23 are likewise provided with openings to receive the transverse pivot pin 18 so that the member 22 and the tool shank 19 may rock as a unit about the axis of the pin 18.

Extending between the forward ends of the brackets 23 is another transverse pivot pin 27 upon which is mounted, between the forward extensions of the brackets 23 beyond the plate 24, the eye 28 of a bolt 29. The shank of the bolt 29 extends upwardly through an opening 30 provided in the horizontal flange portion 31 of the angle bar 10, the opening being oversize for free movement of the bolt shank therein. The upright portion of the bolt 29 extending upwardly through the flange 31 is surrounded by a spring 32 which operatively engages the flange 31 at its lower end and a nut 33 at its upper end, the nut 33 being mounted on the threaded end of the eyebolt.

The tool-carrying shank 19 is capable of pivoting about the axis of the pin 18 to avoid obstructions in the ground, and vibratory motion is imparted thereto in operation by the provision of the spring 32. Pivoting of the tool shank is thus accomplished against the resistance of the spring 32 and a vibratory action is imparted to the tool shank, resulting in improved tilling of the soil by the earth-penetrating element 31.

While the invention has been described in one embodiment only, it may be understood that modifications may be made therein without departing from the spirit of the invention or the scope of the appended claims.

What is claimed is:

1. In an agricultural implement including a transverse frame and an earth working tool having a lower earth penetrating portion and an upper shank portion, means for mounting the tool on the frame comprising a channel member removably secured to the upper end of the shank including depending flanges straddling the shank and extending beyond the upper end thereof to resist lateral movement of the shank relative thereto and provided with transversely aligned apertures, a pivot pin received in said apertures, a bracket affixed to the frame including spaced lugs adapted to straddle said channel and pivotally mounted on said pin, a second pivot pin mounted in said channel spaced from the first mentioned pin longitudinally of the shank, a spring pressure device connecting said second pin to the frame, said spring pressure device comprising a rod pivotally connected at one end to the second pin and said frame having an opening to slidably receive the rod, and a spring surrounding the rod and operatively engageable with the frame to yieldably resist pivoting of the channel and tool relative to the frame.

2. In an agricultural implement including an earth working tool having an upper horizontal shank, a transverse angle bar support having a horizontal forwardly extending flange and an upwardly extending flange, means for mounting the tool on the angle bar comprising a clamping element secured to the upwardly extending flange having laterally spaced depending lugs, a transverse pivot pin mounted between said lugs, a longitudinally elongated channel member affixed to the end of the shank and pivotally mounted on said pin for rocking of the shank in a vertical plane, a second transverse pivot pin carried by said channel member at the forward end thereof, an upwardly extending rod pivotally connected at its lower end to said second pin, the horizontal flange of said angle bar having an opening therein to slidably receive said rod, and a spring surrounding said rod and engageable with said horizontal flange to resist rocking of said tool shank.

References Cited in the file of this patent

UNITED STATES PATENTS

| | | |
|---|---|---|
| 2,125,512 | Martins | Aug. 2, 1938 |
| 2,493,811 | Graham | Jan. 10, 1950 |
| 2,627,798 | Graham | Feb. 10, 1953 |
| 2,712,781 | Rolf | July 12, 1955 |

FOREIGN PATENTS

| | | |
|---|---|---|
| 111,910 | Australia | Nov. 8, 1940 |